Sept. 11, 1956     G. M. KRIEGBAUM     2,762,535
FERTILIZER DISTRIBUTOR

Filed July 10, 1953     2 Sheets-Sheet 1

INVENTOR
GEORGE M. KRIEGBAUM

Paul O. Pippel

ATTORNEY

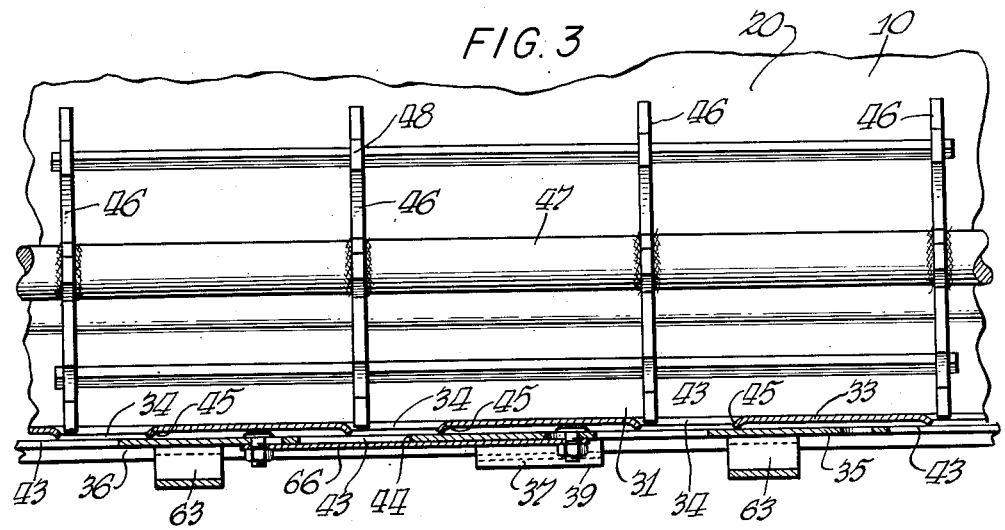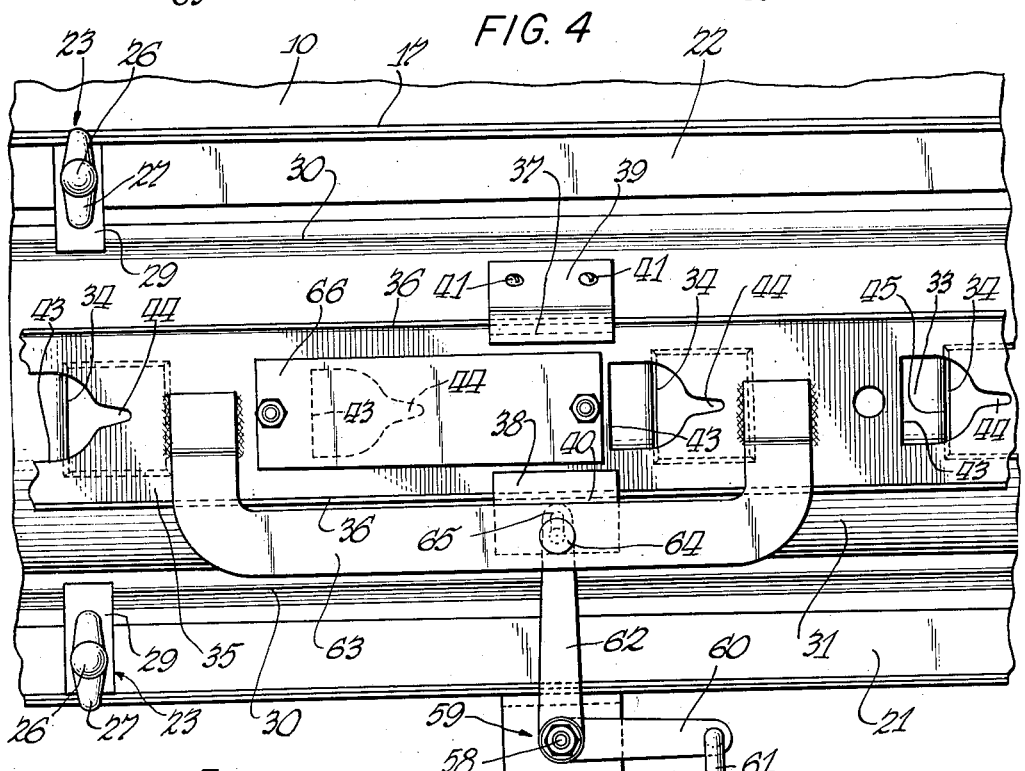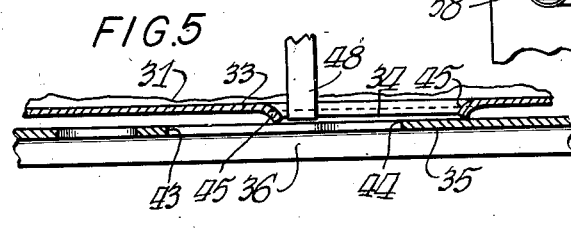

United States Patent Office 2,762,535
Patented Sept. 11, 1956

2,762,535

FERTILIZER DISTRIBUTOR

George M. Kriegbaum, Homewood, Ill., assignor to International Harvester Company, a corporation of New Jersey Application July 10, 1953, Serial No. 367,243

8 Claims. (Cl. 222—485)

This invention relates to material dispensers and particularly to distributors for fertilizer and the like. More specifically the invention concerns a fertilizer distributor of the elongated hopper type adapted to be propelled by a tractor and extending transversely of the direction of travel.

Fertilizer distributors of the type with which this invention is concerned are usually mounted upon wheels and provided with a hitch frame for connection to a propelling vehicle. The elongated hopper which carries the material such as fertilizer is provided with agitators to facilitate the discharge of the fertilizer, and with a base plate extending lengthwise of the hopper and slidable relative thereto, the base plate being provided with openings registrable with openings in the bottom of the hopper and movable relative to the hopper to vary the size of the discharge opening so as to regulate the quantity of material to be dispensed. One of the difficulties experienced with hoppers and slide plates of this type is that the frictional engagement of the plate with the surface of the bottom of the hopper makes the regulation thereof difficult, and material such as fertilizer getting between the bottom and the slide plate interferes with the proper operation thereof. Another difficulty has been that fertilizer hoppers of this type are difficult to clean and usually must be dismantled entirely or inverted, and the cleaning process is not satisfactory. An object of the present invention is, therefore, the provision of an improved distributor for fertilizer and the like having improved means for regulating the discharge of material from the hopper.

Another object of the invention is the provision of a fertilizer hopper of novel construction facilitating the emptying and cleaning of residues therefrom.

Another object of the invention is the provision of a novel fertilizer distributor of improved construction having strengthening means for resisting torque stresses.

Another object of the invention is the provision of a fertilizer hopper bottom and slide plate construction wherein the area of frictional contact of the slide plate with the hopper bottom is reduced to a minimum.

A further object of the invention is the provision of an improved fertilizer distributor construction wherein the hopper bottom is separable and easily removable from the main body of the hopper to facilitate cleaning of residues therefrom.

Other objects and advantages of the invention will become clear from the following detailed description when read in conjunction with the accompanying drawings, wherein:

Figure 3 is a section taken on the line 3—3 of Figure 2 showing a portion of the fertilizer hopper;

Figure 4 is a view from below of the fertilizer hopper showing the relationship of the slide plate to the hopper bottom and part of the mechanism by which the slide plate is adjusted;

Figure 5 is an enlarged sectional detail of a portion of the structure shown in Figure 3 illustrating the relationship of the slide plate to the hopper bottom.

Figure 1:
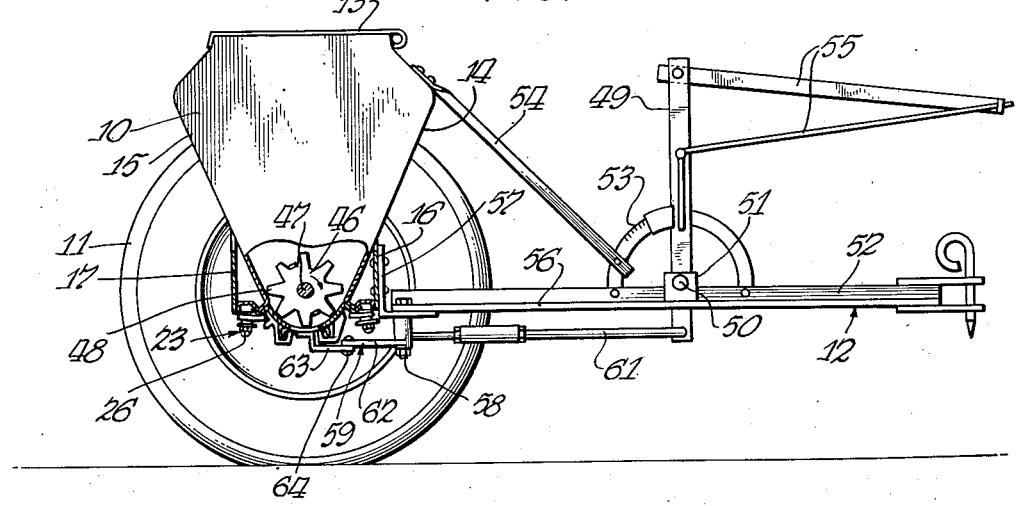
Figure 1 is a view in side elevation and partly in section, and with one wheel removed, of a fertilizer distributor incorporating the features of this invention.
Figure 2:
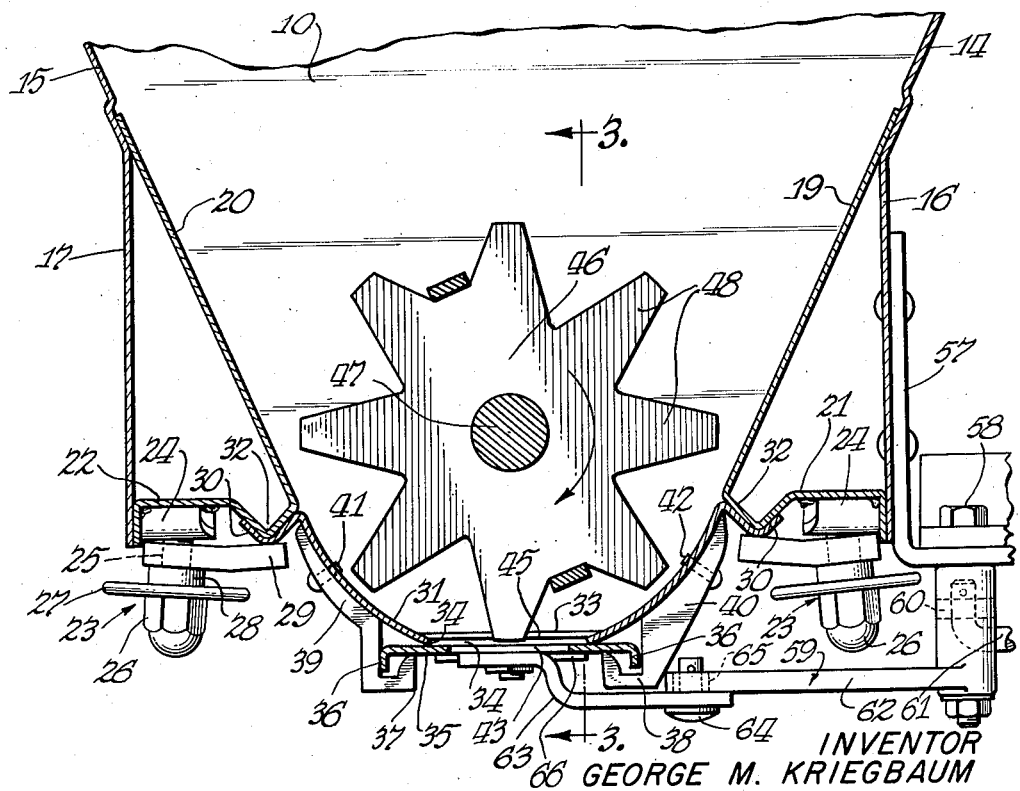
Figure 2 is an enlarged detail, in section, of a portion of the fertilizer distributor shown in Figure 1.

Referring to the drawings, it may be noted that the fertilizer distributor of this invention includes an elongated, transversely extending hopper 10 mounted upon laterally spaced wheels 11, only one of which is shown, and having a hitch structure 12 for connection of the implement to a vehicle such as a tractor. The hopper 10 is provided with a cover 13 and downwardly converging front and rear panels 14 and 15, respectively. As shown particularly well in Figure 2, panels 14 and 15, at the front and rear of the implement, have vertical lower portions 16 and 17, respectively. Forming continuations of the panels 14 and 15 are extended panel parts 19 and 20, respectively, the upper ends of which are affixed to the panels 14 and 15 and the lower ends of which are provided with flange panels 21 and 22 for connection, respectively, to the vertical portions 16 and 17. The parts 16, 19 and 21 on the forward side, and 17, 20 and 22 on the rear side of the hopper 10 form hollow triangular strengthening members which reinforce the hopper against torque stresses.

The flanges 21 and 22 provide a support for anchoring thereto clamps generally indicated by the numeral 23. On each side of the hopper these clamps 23 are provided at spaced locations lengthwise thereof and since they are substantial duplicates, a description of one should suffice for all. Each of the clamps 23 comprises a base 24 welded to the flange 21 or 22 and having a threaded bolt shank 25 extending downwardly therefrom. A cap or nut 26 is provided, having a flange 27 and a shoulder 28 engageable with a clip 29 carried by the bolt 25 and having a projecting portion engageable with a flange 30 at the upper end of the hopper bottom 31 and bent to conform to a complementary bend in the lower projecting portion 32 of the extensions 19 and 20. By tightening the nuts 26 the clips 29 hold the hopper bottom 31 against the lower ends of the extensions 19 and 20 of the hopper.

The hopper bottom 31 is arcuate in shape and has a flattened base portion 33 which, as shown particularly well in Figures 3 and 4, is provided at longitudinally spaced locations with a plurality of rectangular openings 34. Extending lengthwise of the hopper bottom and parallel to the flattened portion 33 thereof is a slidable adjusting plate 35, which is channel-shaped in section, and has flanges 36 extending downwardly and confined in guide channels 37 and 38 provided in brackets 39 and 40 attached by rivets 41 and 42 to the bottom 31 of the hopper at opposite sides thereof.

The base plate 35 is provided with a plurality of spaced apertures 43 adapted to register in varying degrees with the openings 34 in the hopper bottom. By movement of the slide plate 35 longitudinally of the hopper, more or less of the openings 34 and 43 will be in registry so that more or less material may be discharged from the hopper, and each of the openings 43 is provided with a substantially restricted portion 44 so that small amounts may be dispensed.

It will be noted that the slide plate 35 is spaced from the flat portion 33 of the hopper bottom and engages the hopper bottom only at points defined by the edges of the openings 34. In Figures 3 and 5, it will be noticed particularly well that the edges of the openings 34 are embossed to provide downwardly flaring edges forming a raised rim 45 which projects below the surface of the main body of the hopper bottom. This provides a minimum area of contact of the slide plate with the hopper bottom and insures a minimum of frictional resistance.

Furthermore, should fertilizer discharge from the hopper get between the hopper bottom and the slide plate in the space provided, the fertilizer will find its way to one of the openings 43 in the slide plate and be discharged upon the ground.

More or less conventional mechanism is provided for preventing the clogging of the openings 43 and 34 in the form of agitator wheels 46, a plurality of which are mounted at spaced locations on a transverse shaft 47 extending lengthwise of the hopper. These members or wheels 46 are provided with projecting fingers 48 which, as indicated in the drawings, project partly into the openings 34 provided in the hopper bottom and facilitate the discharge of the fertilizer.

More or less conventional mechanism is provided for shifting the slide plate 35 to regulate the flow of fertilizer. This mechanism includes a lever 49 pivoted at 50 on a lug 51 mounted on the bar 52 forming a part of the hitch frame 12, and movable over a quadrant 53 affixed to the bar 52. The quadrant 53 also serves as the anchor for one end of a brace 54, the other end of which is secured to the upper portion of the hopper 10. Suitable control means 55 is provided for the lever 49 and extends forwardly to a location accessible to the operator of the tractor by which the implement is drawn.

The bar 52 is provided with a lateral flange 56 for securing the bar to an angle bracket 57 affixed to the vertical panel 16 of the hopper, and also supports a pivot bolt 58, the lower end of which has mounted thereon a bell crank 59, one arm 60 of which is connected by an adjustable link 61 with the lower end of the lever 49 projecting below its pivot 50. The other arm 62 of the bell crank is pivotally connected to an ogee-shaped member 63 by means of a pin 64 carried by the arm 62 and received in a slot 65 in the member 63. The member 63 is affixed to the slidable plate 35. Adjustment of the lever 49 on its quadrant 53 locks the bell crank 52 and adjusts the position of the plate 35 to regulate the quantity of fertilizer flowing from the hopper. Other regulatory means may be provided in the form of a cover plate 66, several of which may be provided lengthwise of the hopper, to cover any desired number of the openings 43 in the slide plate 35. The use of the cover members 66 is optional and merely serves as another means of controlling the quantity of fertilizer flowing from the hopper.

It should be clear from the foregoing that a novel fertilizer distributor construction has been provided which avoids many of the disadvantages inherent in distributors of material such as commercial fertilizers which are not only corrosive but tend to bridge and form lumps, and require frequent cleaning of the fertilizer distributing mechanism. In the present instance the cleaning of the box is facilitated, as pointed out before, by the provision of means for readily removing the hopper bottom to make the interior of the hopper readily accessible for cleaning purposes. Another disadvantage in the form of the extensive area of frictional engagement of the conventional adjusting plate with the bottom of the conventional hopper is avoided by the novel construction herein described wherein the embossed or flared edges of the openings in the hopper bottom provide a minimum frictional area of contact of the slide plate, which facilitates its adjustment and minimizes the tendency of fertilizer to accumulate between the slide plate and the hopper bottom to interfere with the proper operation of the machine.

The invention has been described in its preferred embodiment and it should be understood that modifications may be made therein without departing from the spirit of the invention or the scope of the appended claims.

What is claimed is:

1. In a material dispenser for fertilizer and the like, an elongated hopper including sides and a bottom having spaced openings therein for the discharge of material from the hopper, a slide plate extending lengthwise of the hopper bottom and having apertures therein registrable with the openings in the said bottom, said plate being slidable lengthwise of the hopper bottom to vary the effective size of the discharge opening, and a raised rim surrounding the edges of the openings in the hopper bottom projecting from the main body thereof, and the lower edges of said raised rim being engageable with the slide plate to provide a space therebetween and the main body of the hopper bottom.

2. The invention set forth in claim 1, wherein the edges of the openings in the hopper bottom are flared outwardly to provide the said raised rim for engagement with the slide plate.

3. In a material dispenser for fertilizer and the like including an elongated hopper having a bottom provided with spaced openings for the discharge of material from the hopper, a slidable plate subadjacent the hopper bottom having spaced openings registrable with the openings in the hopper bottom, said plate being slidable longitudinally of the hopper bottom to vary the size of the registering openings therein and regulate the flow of material from the hopper, the edges of the openings in the hopper bottom being embossed and engageable with the slide plate to space the latter from the main body of the hopper bottom and reduce the area of frictional contact of the plate therewith.

4. In a material dispenser for fertilizer and the like, an elongated hopper having downwardly converging sides, clamping members carried at the lower ends of said sides, a separable hopper bottom having a flattened base and arcuately shaped sides and having spaced openings formed therein for the discharge of fertilizer from the hopper, said openings having downwardly projecting embossed rims, a slide plate extending lengthwise of the hopper and engageable with said projecting rims, said plate having apertures therein registrable with the openings in the hopper bottom and being slidable relative thereto to regulate the effective size of said openings, and means on said hopper bottom cooperable with said clamping members for releasably securing the bottom to the hopper sides.

5. In a material dispenser for fertilizer and the like, an elongated hopper having downwardly converging sides, clamping members carried at the lower ends of said sides, a separable hopper bottom having a flattened base and arcuately shaped sides and having spaced openings formed therein for the discharge of fertilizer from the hopper, said openings having their edges flared downwardly and projecting below the lower surface of the main body of the hopper bottom, a slide plate extending lengthwise of the hopper and engageable with said projecting rims, said plate having apertures therein registrable with the openings in the hopper bottom and being slidable relative thereto to regulate the effective size of said openings, means carried by said hopper bottom and accommodating the sliding movement of the plate for removably securing the latter to the hopper bottom, and means on the hopper bottom cooperable with said clamping members for releasably securing the bottom to the hopper sides, whereby the hopper bottom and the slide plate may be removed as a unit.

6. In a material dispenser for fertilizer and the like, an elongated hopper having slanting downwardly converging sides and a hopper bottom having openings formed therein for the discharge of material from the hopper, vertical panels near the base of the hopper extending downwardly from said sides in triangular relationship therewith, a bottom panel connecting the base of each vertical panel to the adjacent slanting side panel of the hopper to form a tube of generally triangular section extending lengthwise of the hopper.

7. The invention set forth in claim 6, wherein a separable bottom is provided having the upper edges of its sides shaped to mate with the corresponding lower edges of the hopper bottom, and clamps are provided for removably securing the bottom to the sides.

8. The invention set forth in claim 7, wherein the upper edges of the hopper bottom are provided with flanges engageable with the bottom panels of said triangular tubes, and said clamps are carried by the bottom panels of said tubes and are provided with clamping elements engageable with the flanges to removably secure the bottom to the hopper sides.

References Cited in the file of this patent

UNITED STATES PATENTS

| | | |
|---|---|---|
| 417,115 | Tecktonius | Dec. 10, 1889 |
| 2,510,231 | Juzwiak | June 6, 1950 |
| 2,624,492 | Seltzer | Jan. 6, 1953 |